United States Patent Office 2,838,680
Patented June 10, 1958

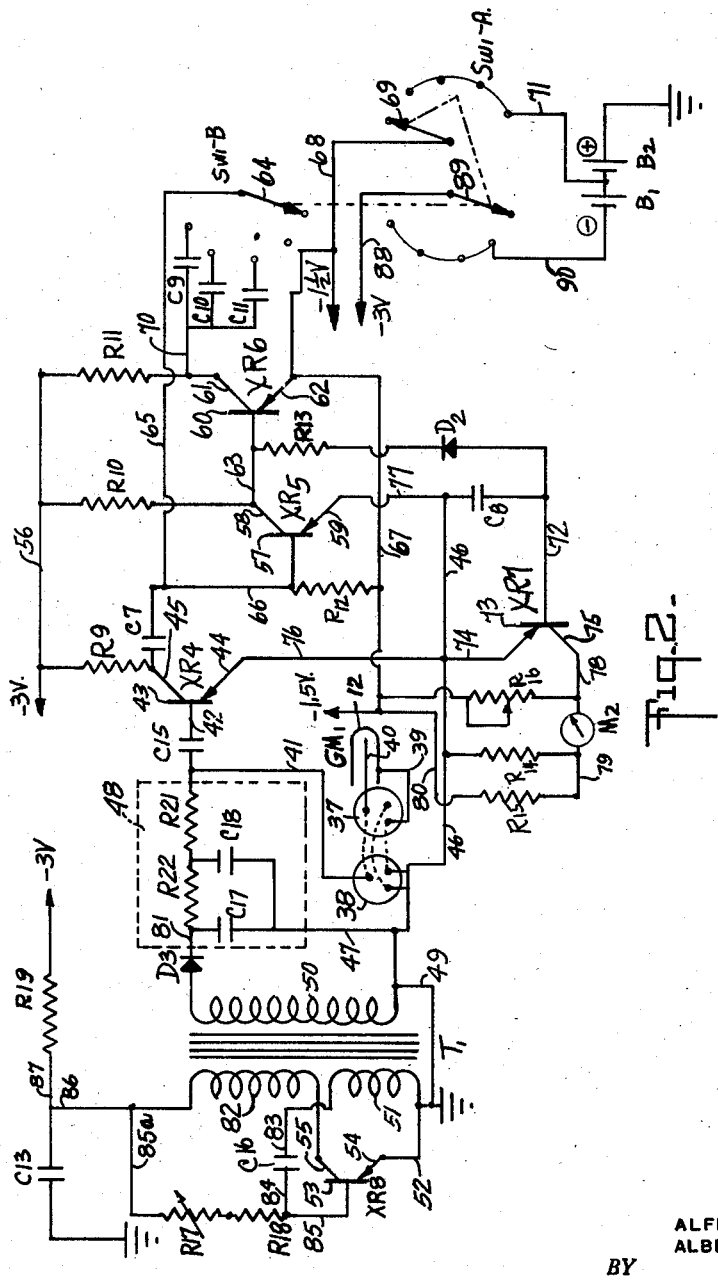

2,838,680

TRANSISTORIZED RATE METER

Alfred Bender, Great Neck, and Albert de la Lastra, New York, N. Y., assignors, by mesne assignments, to Universal Transistor Products Corporation, New York, N. Y., a corporation of Delaware Application October 10, 1955, Serial No. 539,314

7 Claims. (Cl. 250—83.6)

This invention relates to improvements in rate meters and has for a principal object the provision of a rate meter employing a Geiger-Müller or a photo multiplier tube (with crystal) and devised to be used for the detection and measurement of radiation, such as gamma, beta, alpha, cosmic, or neutron.

The new and improved circuit includes a one shot transistorized multivibrator circuit, an integrating and scaling or rate metering circuit, a meter multiplying or range circuit, and a meter balancing or "zeroing" circuit.

One important feature of the invention is the method of normally preventing the multivibrator circuit from oscillating.

Another object of the invention is the provision of a completely transistorized radiation counter or rate meter of high precision, of extreme accuracy and adapted to give consistent results time after time.

A further object of the invention is the provision of a comparatively inexpensive radiation counter in combination with an efficient meter amplifying circuit employing a minimum of components.

Yet another object of the invention is the provision of an improved radiation counter system and meter amplifying system in combination therewith, said systems requiring a minimum of components and employing operating potentials such as are obtained from ordinary dry cells of the flash light variety for example.

Another object of the invention is the provision in a circuit, of the character described herein, a minimum of components such as transistors, capacitors, resistors and rectifiers, and including switching means to provide extreme flexibility in the control of said circuit. This feature permits the construction of a compact light weight portable radiation counter or rate meter, or scintillation counter of precision and accuracy.

The circuit is comprised primarily of an amplifier and/or pulse shaping network, an integrating and scaling or rate metering circuit, and a meter zeroing circuit.

The use of our improved amplifying or pulse forming network enables us to use all of the transistors we employ of one type, namely all PNP or NPN type junction type or point contact type transistors.

The Geiger-Müller tube is supplied with its necessary high voltage by means of a transistorized high voltage supply such as that described in copending application of Alfred Bender, Serial No. 518,739, filed June 29, 1955, now abandoned, and entitled "Transistorized Power Suppy."

Any radiation, such as gamma, beta, alpha, cosmic, or neutron will activate the Geiger-Müller tube thereby producing a negative pulse.

In the accompanying drawings, which are given by way of example to show how to practise the invention:

Figure 2 is a modification of the circuit shown in Figure 1.

Figure 1:
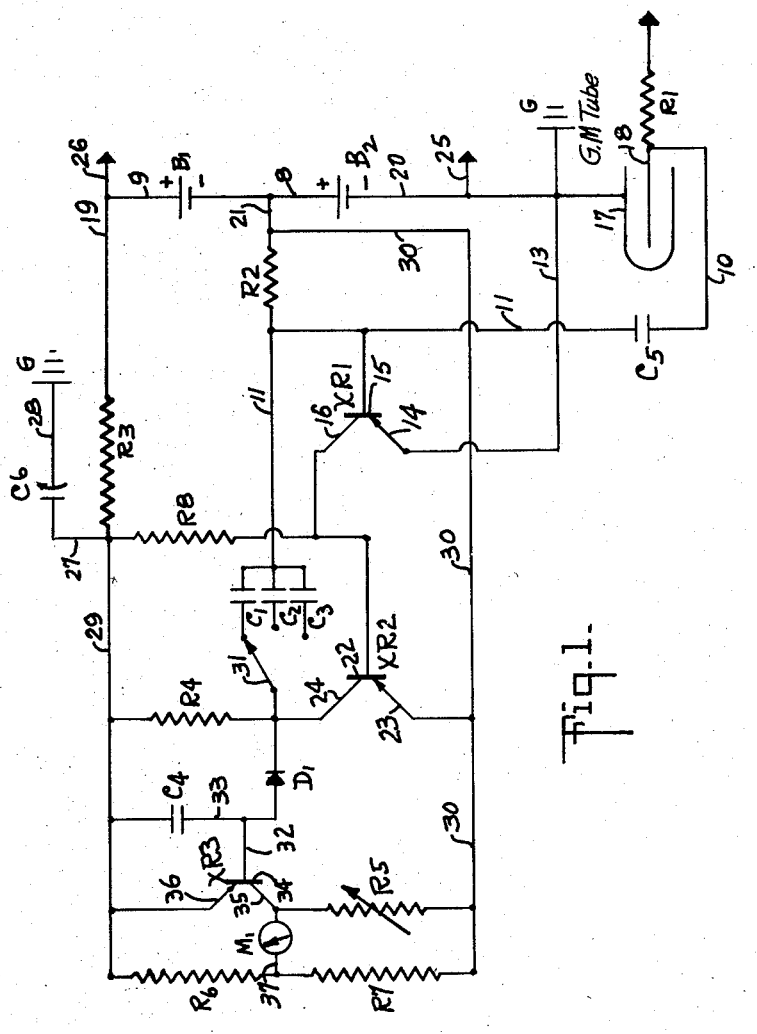
Figure 1 is a circuit diagram illustrating one embodiment of the invention.

Referring first to Figure 1, the Geiger-Müller tube has a positive potential connected to its central element 18 through resistor R1. It is also connected through a conductor 10 to a capacitor C5, and C5 is in turn connected via a conductor 11 to the base 15 of the transistor XR1 and also to one end of a resistor R2 and thence to one terminal of each of a bank of capacitors C1, C2, C3.

The envelope electrode 17 of the Geiger-Müller tube is connected to ground and via a conductor 13 to the emitter 14 of the transistor XR1. The conductor 13 is also connected via a branch conductor 20 to the negative terminal of a battery B2. The positive terminal of this battery is connected via a conductor 8 to the negative terminal of a battery B1, and the positive terminal of B1 is connected via a conductor 9 to a conductor 19. A mid-point between the batteries B1 and B2 is connected via a conductor 21 to the other side of R2.

A conductor 26, joined to the conductor 19 is to be connected to the high voltage supply, and a second conductor 25, between the tube element 17 and the battery B2, is also to be connected to the high voltage supply.

The conductor 19 is connected to one end of R3, and the other end of R3 is connected to a resistor R8, to a conductor 27, and to a conductor 29. The conductor 27 is connected to capacitor C6, and C6 is in turn connected via a conductor 28 to ground.

The resistor R8 is in turn connected to the collector electrode 16 of the transistor XR1 and also to the base electrode 22 of the transistor XR2. The emitter 23 of XR2 is connected to a conductor 30, which in turn connects to the junction of the resistor R2 with the conductor 21, leading to the mid-point between B1 and B2.

The collector 24 of XR2 is connected to a switch arm 31 adapted to traverse contact points connected to the capacitors C1, C2, and C3. The collector 24 is also connected to the conductor 29 through the resistor R4, and also to one terminal of a diode rectifier D1. The other terminal of the diode D1 is connected via a conductor 32 to the base 34 of transistor XR3 and is also connected via a wire 33 to a capacitor C4, and via C4 to the conductor 29.

The emitter 36 of transistor XR3 is connected to the conductor 29 and the latter is in turn connected to one end of a resistor R6. The other end of R6 is connected to a jumper wire 37 and to one end of a resistor R7, and the wire 37 is connected to one terminal of a meter M1 and thence to the collector electrode 35 of the transistor XR3. The other end of the resistor R7 is connected to the conductor 30.

A variable resistor R5 has one end connected to the conductor 30 and its other end is connected to the junction of the meter M1 with the collector electrode 35 of the transistor XR3.

The transistor multivibrator circuit is normally held quiescent, since the transistor XR1, which is normally heavily conducting, is biased by the resistor R2. This bias allows a comparatively large current to pass through the resistor R8. As a result of this the voltage at R8 is sufficient to place a correspondingly large negative bias on the transistor XR2 and normally maintain XR2 at cut-off.

Now a negative pulse from the Geiger-Müller tube is impressed upon the resistor R2, and this pulse reduces the bias on the transistor XR1, and allows less current to flow through the resistor R8. In turn the reduced voltage drop across R8 reduces the bias on XR2, nullifying the cut-off condition of the transistor and permitting it to conduct through the resistor R4. This impresses a negative pulse across R4, which charges the one of the capacitors C1 or C2 or C3 that the switch arm 31 is connected to, thereby compelling the transistor XR1 to remain at cut-off for a period determined by the value of the capacitor switched into the circuit by the switch arm 31 and the value of the resistor R2. Since the value of R2 is fixed, this period is solely controlled by the capacities of C1, C2, and C3 and/or others which may be added if a wider series of time periods is desired.

When the capacitor C1, C2, or C3 (the one switched into the circuit) is discharged, the transistor XR1 will return to its original conducting state, since the resistor R2 will now supply its original biasing voltage to the transistor XR1, and the transistor XR2 will return to its initial (cut-off) state, and the multi-vibrator circuit is quiescent until another negative pulse from the Geiger-Müller tube is impressed on R2.

During the appearance of the negative pulse across the resistor R4, the capacitor C4 becomes charged, and the value of this charge or voltage appearing across the capacitor C4 depends upon the period of conduction by the transistor XR2, and this in turn, as has already been indicated above is determined by the value of the capacitor C1, C2, or C3 that is switched into the circuit. Also the number of pulses obtained from the Geiger-Müller tube determine the cycling described above and this adds to the charge across the capacitor C4. The diode D1 conducts only when a negative pulse appears across the resistor R4 and prevents the discharge of the capacitor C4.

The transistor XR3 amplifies the voltage appearing across the capacitor C4, thus enabling the use of a less expensive, less sensitive and more rugged meter, which can obtain the results that would have been obtained had a highly sensitive and delicate meter been employed without the transistor XR3.

The resistors R5 and R6 constitute a voltage divider network for the meter circuit and the variable resistor R5 is provided to adjust the pointer of the meter to zero.

Referring now to Figure 2, the circuit shown therein includes features not shown in Figure 1.

The Geiger-Müller tube GM1 has its center electrode 40 connected to a plug member 37, which when mated with a mating plug member 38, is connected via a conductor 41 to a capacitor C15 and to one terminal of a resistor R21. The other terminal of the capacitor C15 is connected to the base electrode 43 by a conductor 42.

The conductive casing 12 of the Geiger-Müller tube is connected via a conductor 39 to the plug member 37, and the mating contact in the plug member 38 is connected to a conductor 46 which in turn is connected to a conductor 47 joining capacitors C17 and C18 in a casing 48. A conductor 49 is connected to the conductor 46, to one end of the transformer winding 50, and to one end of the transformer winding 51, and thence to ground, and a conductor 52 is connected to ground and to the emitter electrode 54 of a transistor XR8.

The collector electrode 45 of the transistor XR4 is connected to the junction of a capacitor C7 and a resistor R9. The resistor R9 is connected via a conductor 56, to a resistor R10, and thence to a resistor R11. The conductor 56 is also connected to a source of negative voltage, for example, via the switch arm 89. The resistor R10 is in turn connected to the collector electrode 58 of a transistor XR5 and is also connected via a conductor 63 to the base electrode 60 of a transistor XR6. The collector electrode 61 of the transistor XR6 is connected to the resistor R11, and is also connected via a conductor 70 to one terminal each of capacitors C9, C10, C11, and these capacitors are in turn individually connected to the several contacts of the switch SW1-B. The switch arm 64 of this switch is connected via a conductor 65 to the capacitor C7, and also to the base electrode 57 of transistor XR5 via a conductor 66. The conductor 66 is also connected to one terminal of a resistor R12, and the other terminal of the resistor R12 is connected to a conductor 67, which in turn is also connected to the emitter electrode 62 of transistor XR6. The conductor 67 is also connected via a conductor 68 to the movable arm 69 of SW1-A. A series of contacts of said last switch are connected via a conductor 71 to the negative terminal of a battery B2. The positive terminal of this battery is connected to ground.

A resistor R13 has one end connected to the conductor 63 and in turn to the collector 58 of the transistor XR5 and to the base 60 of the transistor XR6 via a conductor 63. The other terminal of the resistor R13 is connected to a diode D2, which is in turn connected via a conductor 72 to the base 73 of a transistor XR7. The emitter electrode 74 of the transistor XR7 is connected to the emitter 44 of the transistor XR4 via a conductor 76, and this conductor is connected to the conductor 46 which leads to ground, as explained above. The emitter electrode 59 of the transistor XR5 is connected to the conductor 46 via a conductor 77. A capacitor C8 is bridged across the conductors 46 and 72.

The collector electrode 75 of the transistor XR7 is connected via conductor 78 to one terminal of a meter M2, and the other terminal of this meter is connected via a conductor 79, a resistor R15, and a conductor 80 to a source of negative voltage. The conductor 67 is also connected to the conductor 80. A variable resistor R16 is connected across the conductors 67 and 78. A resistor R14 is connected across the conductors 46 and 79.

The other terminal of the transformer winding 50 is connected via a diode D3 to a conductor 81 which connects to one terminal of a resistor R22, and the resistor R22 is connected to the other terminal of the resistor R21. The capacitor C17 is connected to the conductor 81, while the capacitor C18 is connected to the junction of the resistors 21 and 22.

The transformer winding 51 has its other terminal connected via a conductor 83 to a capacitor C16 and this capacitor is connected via a conductor 84 to the junction of a conductor 85 with a resistor R18. The conductor 85 is in turn connected to the base electrode 53 of the transistor XR8.

The transformer winding 82 has one terminal connected to the collector 55 of the transistor XR8, and the other terminal of the winding 82 is connected via a conductor 85a to one terminal of a variable resistor R17. The other terminal of the resistor R17 is connected to the resistor R18, so that the two are in series with conductors 85 and 85a.

The conductor 85a is connected to conductors 86 and 87. The latter joins a resistor R19 and a capacitor C13. The resistor R19 is to be connected to a source of negative voltage, for example, to a conductor 88, which leads to a movable switch arm 89 that traverses a series of contact members connected via a conductor 90 to the negative terminal of the battery B1, for example. The other terminal of the capacitor C13 is connected to ground.

The GM2 tube is supplied its required high voltage from a transistorized high voltage power supply such as that described in copending application Serial No. 518,-739, filed June 29, 1955. However it is built into the combination circuit along with a pulse shaping network, an integrating and scaling or rate metering circuit, a meter multiplying or range circuit, and a meter zeroing circuit.

Any radiation of the types mentioned above herein will activate the GM2 tube and produce a negative pulse. This pulse is delivered through the capacitor C15 to the base 42 of the transistor XR4 and it is amplified and shaped by XR4 and the RC network R9-C7. The pulse now emerging from the capacitor C7 is positive and is delivered to the multivibrator circuit through capacitor C7.

The multivibrator or univibrator circuit comprises the two transistors XR5 and XR6 and the capacitors and resistors interconnected therewith. Normally this circuit is held quiescent. This is effected by making the bias such that the transistor XR5 is normally heavily conducting.

This bias allows a substantial current to flow through the resistor R10.

As a result the voltage drop across R10 is sufficient to place the point where R10 connects the collector 58 and the conductor 63 at a low voltage with respect to ground. This places a large opposite bias on the transistor XR6 and keeps it at cut-off. Now the positive pulse obtained from the collector electrode 45 of the transistor XR4 is applied to the resistor R12 via the capacitor C7. This pulse reduces the bias on the transistor XR5 and allows less current to flow through the resistor R10. Thus a reduced voltage drop across the resistor R10 reduces the bias for the transistor XR6 and permits it to conduct through the resistor R11.

The pulse through the resistor R11 charges the capacitor C9, C10, C11 (whichever one is switched into the circuit) and this in turn, compels the transistor XR5 to remain at cut-off for a period determined by the value of either C9, C10, or C11 and R12, but since resistor R12 is fixed, this period is controlled by the value of the capacitor C9, C10, or C11, switched into the circuit by the switch SW1-B. When the selected capacitor is discharged, the transistor XR5 returns to its original state (conducting), since R12 then supplies its original biasing voltage to the transistor XR5, and thus the transistor XR6 will also return to its original state, namely cut-off.

During the appearance of a negative pulse across the resistor R10, the capacitor C8 becomes charged through the diode D2 and the resistor R13. The value of the charge or voltage appearing across the capacitor C8 is determined by the period of conduction across the transistor XR6. This, as has been pointed out above, is determined by the value of the capacitor C9, C10, or C11 used in the circuit. The number of pulses obtained from the tube GM2 determines the cycling described above and this adds to the charge across the capacitor C8.

The diode D2 conducts only when a negative pulse appears across the resistor R10 and also prevents the discharge of the capacitor C8. The resistor R13 prevents the presence of the capacitor C8 from disturbing the multivibrator circuit and also serves as a calibrating resistor.

The transistor XR7 amplifier the voltage appearing across the capacitor C8, thus offering an advantage in the use of a less sensitive meter movement; and the ability to use a more rugged meter and yet obtain substantially the same effect as if a highly sensitive and delicate meter were used without XR7.

The resistors R14 and R15 serve as a voltage divider network for the metering circuit, while the variable resistor R16 is provided for the "zero" adjusting of the meter needle.

Effectively, the circuit of Figure 2 is a Wheatstone bridge network and any small change in the effective resistance of the transistor XR7 is indicated on the meter M2.

The resistor 19 and the capacitor C13 are provided to filter the power supply.

While our invention has been described in detail and shown with respect to the accompanying examples, it is not to be limited thereto such details, since many changes and modifications may be made in the invention without departing from the spirit and scope thereof. Hence, it is desired to cover any and all forms and modifications of the invention which may come within the language and scope of any one or more of the appended claims.

We claim:

1. In a rate meter for the detection and measurement of radiation, a multivibrator employing a pair of transistors in a circuit, resistance means biasing a first one of said transistors to a point where it is normally heavily conducting, another resistance means interconnected with said first transistor and a second transistor and adapted to hold the latter at cut-off while said first transistor is heavily conducting, capacitor means connected to the junction of said first resistance means with said first transistor and to the output of said second transistor, a Geiger-Müller tube connected in said circuit to deliver negative pulses to said junction, whereby the negative pulses upset the bias on said transistors, causing the second one to become heavily conducting and holding the first one at cut-off, the period of the upset being timed by the discharge of said capacitor means, a meter connected in a circuit with the output of said second transistor, and means in said last circuit to deliver rectified pulses from the output of said multivibrator to said meter.

2. In a rate meter for the detection and measurement of radiation, a multivibrator circuit including a pair of transistors interconnected and having resistance means biasing a first one of said transistors to a point where it is normally heavily conducting, other resistance means in said circuit adapted to normally hold a second transistor at cut-off, whereby said circuit is quiescent, capacitor means in said circuit with one terminal connected to said first resistance means where it joins said first transistor and with its other terminal connected to the output of said second transistor, a Geiger tube interconnected with said first terminal to deliver negative pulses to the junction of said capacitor with said first resistor means, whereby said negative pulses upset the bias on said transistors causing the conditions of each to reverse, the period of the upset being timed by the discharge of said capacitor means, following which said circuit resumes its initial quiescent state, a second circuit connected to the output of said first circuit and including means to rectify pulses received from said first circuit, to amplify the then rectified pulses, and to deliver the amplified rectified pulses to said meter.

3. In a rate meter for the detection and measurement of radiation, a circuit including a pair of transistors interconnected to operate as multivibrators, the interconnections including a first resistance means biasing a first one of said transistors to a point where it is normally heavily conducting, a second resistance means in said circuit adapted to normally hold a second transistor at cut-off, whereby said circuit is normally quiescent, a third resistance means connected to the output of said second transistor and capacitively connected to ground, a Geiger tube connected to deliver negative pulses to said second resistance means, capacitor means connected between said second and said third resistance means and adapted to be charged by said pulses, whereby the latter upset the bias on said transistors for the period required to discharge said capacitor, the state of the first transistor being changed from highly conducting to cut-off and the state of the second being changed from cut-off to highly conducting during said period following which said transistors are returned to their initial states, a second circuit connected to receive pulses from said first circuit and including a meter and components interconnected to rectify and amplify said last mentioned pulses and deliver them to said meter.

4. In a rate meter for the detection and measurement of radiation, a multivibrator employing a pair of transistors in a circuit, resistance means in said circuit biasing a first one of said transistors to a point where it is normally heavily conducting, another resistance means interconnected with said first transistor and a second transistor, and adapted to hold the latter at cut-off while said first transistor is heavily conducting, capacitor means connected to the junction of said first resistance means with said first transistor and to the output of said second transistor, a Geiger-Müller tube connected in said circuit to deliver negative pulses to said junction whereby the negative pulses upset the bias on said transistors, causing the second one to become heavily conducting and holding the first one at cut-off, the period of the upset being timed by the discharge of said capacitor means, a meter connected in a circuit with the output of said second transistor, said meter having a pointer and a zero settable scale, means in said last circuit to deliver rectified pulses from the output of said multivibrator to said meter, variable resistor means bridging the terminals of said meter, and means to supply energy to said circuits.

5. In a rate meter for the detection and measurement of radiation, a multivibrator employing a pair of transistors in a circuit, resistance means in said circuit biasing a first one of said transistors to a point where it is normally heavily conducting, another resistance means interconnected with said first transistor and a second transistor, and adapted to hold the latter at cut-off while said first transistor is heavily conducting, capacitor means connected to the junction of said first resistance means with said first transistor and to the output of said second transistor, a Geiger-Müller tube connected in said circuit to deliver negative pulses to said junction whereby the negative pulses upset the bias on said transistors, causing the second one to become heavily conducting and holding the first one at cut-off, the period of the upset being timed by the discharge of said capacitor means, a meter connected in a circuit with the output of said second transistor, said meter having a pointer and a zero settable scale, means in said last circuit to deliver rectified pulses from the output of said multivibrator to said meter, variable resistor means bridging the terminals of said meter, means to deliver low voltage direct current to said circuits, and means to deliver high voltage direct current to said tube.

6. In a rate meter for the detection and measurement of radiation, a multivibrator employing a pair of transistors in a circuit, resistance means in said circuit biasing a first one of said transistors to a point where it is normally heavily conducting, another resistance means interconnected with said first transistor and a second transistor, and adapted to hold the latter at cut-off while said first transistor is heavily conducting, capacitor means connected to the junction of said first resistance means with said first transistor and to the output of said second transistor, a Geiger-Müller tube connected in said circuit to deliver negative pulses to said junction whereby the negative pulses upset the bias on said transistors, causing the second one to become heavily conducting and holding the first one at cut-off, the period of the upset being timed by the discharge of said capacitor means, a meter connected in a circuit with the output of said second transistor, said meter having a pointer and a zero settable scale, means in said last circuit to deliver rectified pulses from the output of said multivibrator to said meter, variable resistor means bridging the terminals of said meter, means to deliver low voltage direct current to said circuits, and transformer means connected in a circuit with a transistor and a rectifier, said circuit including a filter system for delivering comparatively high voltage to said tube.

7. In a rate meter for the detection and measurement of radiation, a multivibrator circuit including a pair of transistors interconnected and including resistance means biasing a first one of said transistors to a point where it is normally heavily conducting, other resistance means in said circuit adapted to normally hold a second transistor at cut-off, whereby said circuit is quiescent, capacitor means in said circuit with one terminal connected to said first resistance means where it joins said first transistor and with its other terminal connected to the output of said second transistor, a Geiger tube interconnected with said first terminal to deliver negative pulses to the junction of said capacitor with said first resistor means, whereby said negative pulses upset the bias on said transistors causing the conditions of each to reverse, the period of the upset being timed by the discharge of said capacitor means, following which said circuit resumes its initial quiescent state, a second circuit connected to the output of said first circuit and including means to rectify pulses received from said first circuit, to amplify the then amplified pulses, and to deliver the amplified rectified pulses to said meter, said meter having a zero scale and a pointer traversing said scale, and variable resistance means connected across the terminals of said meter for setting said pointer to zero.

References Cited in the file of this patent

UNITED STATES PATENTS

| | | |
|---|---|---|
| 2,728,862 | De Bourgknecht | Dec. 27, 1955 |
| 2,737,595 | Scherbatskoy | Mar. 6, 1956 |
| 2,740,051 | Scherbatskoy | Mar. 27, 1956 |

OTHER REFERENCES

Pearlman, Alan R.: "Transistor Power Supply for Geiger Counter," Electronics, August 1954, pages 144 and 145.

Taylor, Denis: "Trends in Nuclear Instrumentation," Nucleonics, October 1954, pages 12 to 19, particularly pages 17–19.